United States Patent [19]
Waterbury

[11] 3,971,454
[45] July 27, 1976

[54] SYSTEM FOR GENERATING ELECTRICAL ENERGY TO SUPPLY POWER TO PROPEL VEHICLES

[76] Inventor: Nelson J. Waterbury, 400 Coconut Row, Palm Beach, Fla. 33480

[22] Filed: Apr. 13, 1973

[21] Appl. No.: 350,944

Related U.S. Application Data

[63] Continuation-in-part of Ser. No. 135,551, April 20, 1971, abandoned.

[52] U.S. Cl............................... 180/65 R; 165/43; 191/4; 237/12.3 R; 290/16; 318/440; 320/56
[51] Int. Cl.²....................................... B60L 11/12
[58] Field of Search................. 180/65 R, 65 A, 60; 191/2–4; 250/216, 215; 136/89; 296/97 F; 165/43; 237/12.3 R; 290/16; 320/56, 61, 62; 318/440

[56] References Cited
UNITED STATES PATENTS

| | | | |
|---|---|---|---|
| 1,606,547 | 11/1926 | Ward | 180/65 A |
| 2,562,895 | 8/1951 | Dreyer | 296/97 F UX |
| 2,622,117 | 12/1952 | Benzer | 136/89 |
| 2,920,710 | 1/1960 | Howard | 180/67 |
| 3,018,313 | 1/1962 | Gattone | 136/89 |
| 3,444,946 | 5/1969 | Waterbury | 180/65 R |
| 3,675,026 | 7/1972 | Woodall | 136/89 X |

FOREIGN PATENTS OR APPLICATIONS

| | | | |
|---|---|---|---|
| 225,089 | 4/1943 | Switzerland | 180/67 |

OTHER PUBLICATIONS

Popular Mechanics, June 1960, p. 122 "Sun Powers Old Car."

*Primary Examiner*—David Schonberg
*Assistant Examiner*—Milton L. Smith
*Attorney, Agent, or Firm*—Kenyon & Kenyon Reilly Carr & Chapin

[57] ABSTRACT

Solar radiant energy and high-intensity light are converted to electrical energy to supply electrical power for propelling vehicles in a safe, economical and efficient manner.

The radiant energy can be beamed from outer space by the use of satellites with collecting surfaces which can produce and store electrical power and which can distribute the electrical power to earth stations for redistribution to high-intensity light sources. High-intensity light-receiving cells or panels are fixed to the surface of a vehicle to collect the high-intensity light and to convert the light into useful electric power to operate the vehicle. Energy can be stored in batteries for subsequent use.

A vehicle can also be powered by hybrid means including solar cells and gas turbines.

12 Claims, 14 Drawing Figures

SYSTEM FOR GENERATING ELECTRICAL ENERGY TO SUPPLY POWER TO PROPEL VEHICLES

This application is a continuation-in-part application of U.S. patent application Ser. No. 135,551, filed Apr. 20, 1971 now abandoned.

This invention relates to a system for driving vehicles through the use of electric power, particularly by converting radiant energy into electrical energy.

BACKGROUND OF THE INVENTION

Air pollution is currently a very serious problem, particularly in and around large cities. Automobile engines are a major cause of such pollution as they discharge large quantities of carbon monoxide and other noxious materials into the atmosphere which is incapable of rendering such materials harmless sufficiently rapidly to avoid accumulation of these materials in the air.

Various solutions have been proposed including internal combustion engines with after-burner devices, steam-powered automobiles, electric-powered automobiles, and various hybrids of these and other systems. Such systems have various disadvantages, and electric-powered automobiles, the field to which the present invention relates, suffer in particular from a severe limitation on the distance they can travel before their electric power stores require recharging.

OBJECTS OF THE INVENTION

It is an object of the invention to provide a system for efficiently powering vehicles using electrical energy.

It is another object of the invention to provide a clean pollution-free energy system for powering automobiles.

It is another object of the invention to provide an efficient system for utilizing electrical energy.

SUMMARY OF THE INVENTION

The present invention seeks to overcome this limitation, whilst at the same being virtually pollution free, by utilizing a hybrid system in which an electric battery consisting of a multiplicity of cells is charged by a series of space-type solar cells and backed up by a gas turbine engine that automatically operates in an emergency as an auxiliary charged system in the event that the solar system does not keep the batteries fully charged.

The new solar-electric type vehicle of the invention has been made possible by advances in space technology. The presently preferred battery is composed of cells of the type used in the Gemini and Apollo space missions such as Apollo XI which made the first successful manned landing on the moon.

In order to overcome the problems stated above, the present invention provides an electric-motor driven vehicle having a motor or multiplicity of motors to supply power to the wheels of said vehicle, the improvement thereto comprising batteries arranged in a series, parallel, or series-parallel circuit. The batteries obtain their power from a solar cell bank, said solar cells being arranged in a series-parallel, series, and parallel circuit and protected from reverse current from the batteries by isolating devices; a gas turbine utilizing liquified hydrocarbons for fuel; said turbine driving a generator which is connected through a regulating device to the batteries to assist the solar cells in maintaining a constant charge. The generator is regulated by a feedback loop from the regulating device to prevent overcharging said batteries. This feedback loop also regulates the fuel supply to the turbine to maintain optimum fuel consumption in order to minimize pollution of the atmosphere. A gas system, preferably a Freon gas system, which utilizes waste heat energy from the exhaust of the gas turbine drives a free-wheeling turbine or multiplicity of free-wheeling turbines which are attached to the drive shaft of the generator to provide additional power and torque to the drive shaft of the generator entirely from the waste heat output of the gas turbine and thereby reduces the output of pollutants from the gas turbine while improving the efficiency of the drive system of this self-contained electric powered vehicle.

The above power sources are complemented by an auxiliary charging system which system permits a full charge to be maintained on the batteries at all times while the vehicle is at rest or in shadow or overnight or whenever the solar cells are out of direct sunlight. Each power source complements all others to provide full power to said self-contained electric vehicle, and reduce the overall output of pollutants to the endangered environment. The control system for said vehicle comprises electronic micro-circuitry of the transistor, MSI and LSI types, utilizing TTL-type logic and pulse-width non-dissipative drive to the motor or multiplicity of motors to further increase efficiency and reduce pollution. The pulse width drive provides optimum operation over the full range of vehicle operation without the need for manual or other electro-mechanical steeping devices.

The power sources have the capability to individually power the self-contained electric vehicle in a normal manner except that the Freon system shall operate in conjunction with the gas turbine, in conjunction with or separately from the batteries, which may by themselves provide power for the vehicle, the batteries being of the compact, high-energy types normally associated with such systems as the Apollo, Gemini, and other satellite and missile systems.

In addition to the above, the present invention provides a system for generating electrical energy from solar radiant energy for use in propelling vehicular means, such as automobiles. This system comprises a collector means for receiving and converting radiant energy into electrical energy, receiver means remote from the collector means for receiving the electrical energy converted in the collector means and for distributing the received electrical energy, at least one high intensity lamp means remote from the receiver means for receiving and converting the distributed electrical energy into high-intensity light, and vehicular means having at least one cell for receiving and converting the high-intensity light into electrical energy and propulsion means connected to the cell for receiving electrical energy for propelling the vehicular means.

The collector means for the system can be located in space while the receiver means is located on earth, for example, on land or at sea level. Such a collector means can be in the form of at least one earth-orbiting satellite having radiant-energy collecting surfaces for converting radiant energy into electrical energy as well as a means for directing the electrical energy to the receiver means, for example, in the form of microwaves. The satellite can be provided with a sun-tracking device to orient the collecting surfaces in a predetermined position relative to the sun to constantly receive radiant energy from the sun. The satellite may also have means for storing the electrical energy.

The lamp means includes a network of high-intensity lamps disposed, for example, along a roadway. These lamps can provide a dual function in providing a means for delivering electrical energy to a vehicle while at the same time providing for illumination of the roadway. The lamps can be disposed above the roadway, alongside the edges of the roadway or in the roadway with the light receiver cells positioned according on a vehicle. In order to provide a sufficient light, the lamps each generate from 20,500 lumens to 100,000 lumens of light. The peak emission desired is 0.8 u.m. (micrometers) to 0.9 u.m.

The vehicular means can be of any suitable type such as an automobile, an air ship or a sea-faring vessel. In the case of a vehicle, such would have a means, such as a drive motor, for propulsion of the vehicle as well as an electric battery means for activating the propulsion means. In addition, the vehicle carries the solar cell means on an outside surface, such as the roof, for converting radiant solar energy into electrical energy which can be delivered to the battery means. The other cell means are also mounted on the vehicle, for example, on the sides, or on the roof and sides for converting high-intensity artificial light into electrical energy for subsequent delivery to the battery means.

In order to supplement the drive forces for the vehicle, the vehicle may also have an auxiliary means for propulsion. Such an auxiliary means can include a solar-steam generator for generating steam and a steam-driven means connected to the generator for propelling the vehicle.

In the various embodiments, where cells are provided to convert radiant energy into electrical energy and high-intensity light into electrical energy, the battery means can have a capacity for storing electrical energy. In this way, a vehicle can operate during daylight hours directly from the radiant energy provided by the sun while at other times, the energy can be provided by the high-intensity lamps or by the stored electrical energy. Should none of these sources of entry be available, the auxiliary means can be used to propel the vehicle.

The invention further provides a method of providing motive energy to a vehicle which comprises the steps of positioning a network of high-intensity light lamps along a roadway to illuminate the roadway with high-intensity light and of providing an electrical powered vehicle with a cell means for receiving and converting radiant energy from the sun in combination or individually with high-intensity light from the lamps into electrical energy.

These and other objects and advantages of the invention will become more apparent from the following detailed description and appended claims taken in conjunction with the accompanying drawings in which:

Figure 1:
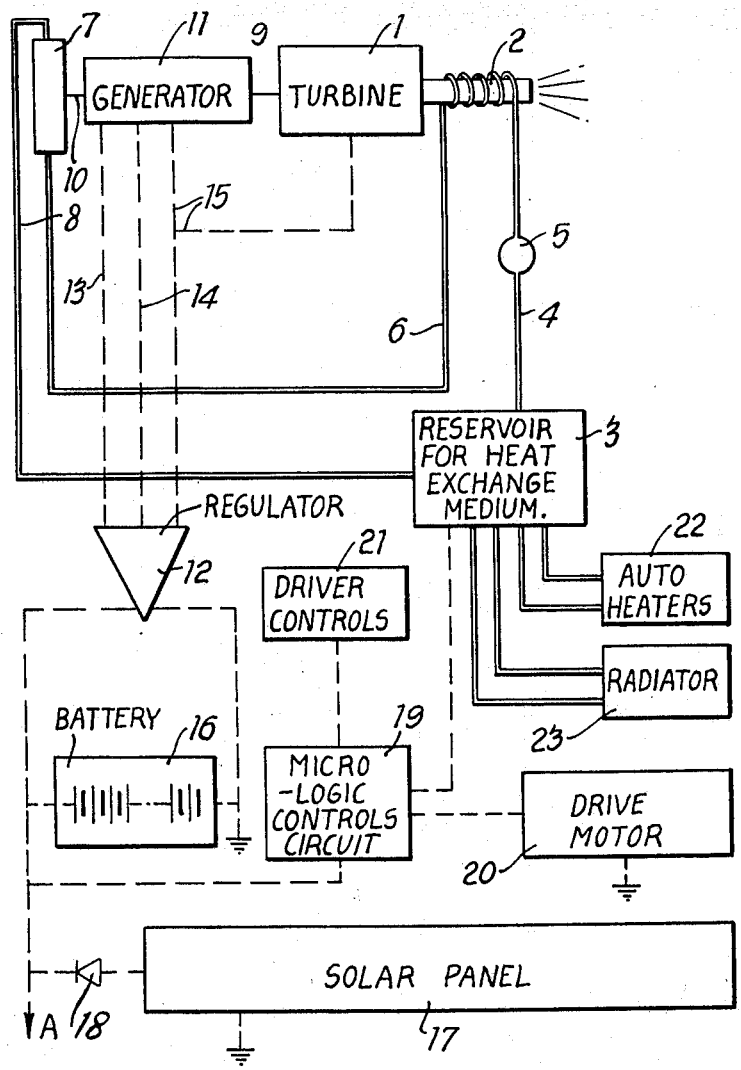
FIG. 1 illustrates a schematic block diagram of the components of an embodiment of the invention.

Referring to FIG. 1, which shows an embodiment of the present invention by way of example, 1 denotes a turbine having a motor driven by the combustion products of a suitable gas, such as butane, chosen for the low pollutant content of those combustion products. The turbine 1 is provided with an exhaust 2 for hot gas leaving the turbine, and this exhaust is combined with a heat exchanger. A heat exchanger medium circulates in the heat exchanger, being forced therethrough from a reservoir 3 via a conduit 4 by a pump 5. The pump may be, for example, a positive displacement rotary pump. The heat exchanger medium is advantageously a non-flammable fluorinated hydrocarbon.

The outlet of the heat exchanger is connected via a conduit 6 to the inlet of a free-wheeling turbine 7 or a multiplicity of such turbines. The outlet of the turbine 7 is connected via a conduit 8 to the reservoir 3. Such turbines are sometimes alternatively known as power-recovery turbines and are well-known in, for example, reciprocating aircraft engines. They have the characteristics that they deliver power only when the internal gas velocity exceeds its "steady state" speed. The output shafts 9 and 10 of the turbine 1 and turbine 7 respectively are both coupled to an electrical generator 11 which may be of conventional type. The electrical output of the generator is supplied to a voltage regulator 12 via leads 13 and 14. A feedback connection 15 is provided between the regulator and the generator and turbine so as to control the operation of the last two units in response to the voltage sensed by the regulator.

The regulator 12 is connected to a battery 16, such as a sodium-sulphur cell battery, which consists of a number of cells connected together. In FIG. 1 the cells are shown as being connected in series though they could equally well be connected in series-parallel circuit. The cells used must be small enough and light enough to fit into an average sized automobile without adding too much weight. A preferred battery consists of nickel-silver cells of the type used in the Gemini and Apollo space missions, for example, it may consist of three hundred such cells connected in series. These cells are assembled in a number of separaate trays for ease of mounting, for example 15 trays of 20 cells each. Nickel-silver cell batteries are about one-eighth the size of conventional batteries and have a greater life.

Alternative cells include, for example, zinc-air cells, and alkali metal/sulfur cells. FIG. 1 shows the electrical system being negatively grounded though it could be positively grounded instead.

At least one solar panel 17 composed of a number of solar cells is connected electrically to the battery 16 via a protecting diode 18 which protects the cells from reverse current from the battery. The solar cells may be connected in series or series-parallel circuit within the or each solar panel. Besides receiving a charge via the regulator 12 and from the solar panel 17 the battery may also be connected at A, when the vehicle is stationary, to an auxiliary power source such as a 110 v. A.C. mains supply. This enables the battery to be maintained at full charge when the vehicle is stationary and not exposed to sunlight, i.e. when neither of the other charging sources is operative.

Power is supplied from the battery via a micrologic control circuit 19 to a drive motor system 20. The system 20 may consist of a single electric motor or of a plurality of such motors. The control circuit is responsive to operation of drive controls 21 as well as a speed signal fed to it from the drive motor system. Preferably, the or each motor is a three-phase A.C. induction motor. This requires that the DC voltage of the battery should be converted to AC, and FIG. 2 shows diagrammatically a method of doing this, as is described further hereinafter.

Besides supplying power to the turbine 7, the heat exchange medium may supply heat to automobile heaters 22. Any excess heat is dumped in a sealed radiator 23 similar to that used in a conventional refrigerator.

Figure 2:
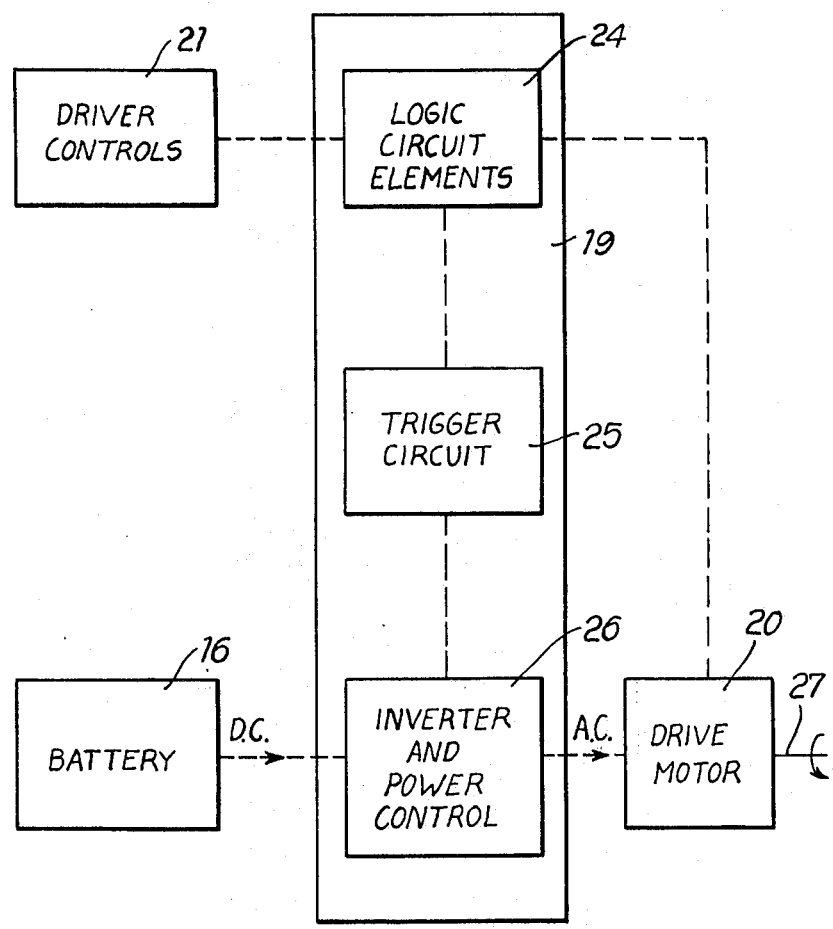
FIG. 2 illustrates a similar diagram to FIG. 1 of a detail of the micro-logic control circuit of FIG. 1.

FIG. 2 shows a standard micro-logic control circuit 19 which includes logic circuit elements 24 responsive to the driver controls 21 which include the accelerator and gear selector. The logic circuit elements 24 are also responsive to a speed signal supplied by the drive motor, and the elements 24 function to provide a control signal indicative of the frequency which it is desired to apply to the windings of the drive motor, that frequency being determined on the basis of the speed at which the motor is actually rotating and the rotor slip speed which corresponds to the torque which the condition of the driver controls demands. The control signals are transmitted to a trigger circuit 25 which produces pulses of an appropriate frequency and width, and these pulses are in turn supplied to an inverter and power control unit 26 which converts the D.C. current supplied by the battery into A.C. current composed of pulses of the desired frequency and width. Variation of the width of the pulses produced by the inverter enables the power supplied to the motor to be varied without changing the frequency, although a combination of pulse width and pulse frequency variation may be used, if desired. The inverter supplies power to the drive motor 20 which causes the output shaft 27 thereof to rotate.

Preferably, each drive motor is located at the rear of a rear-wheel drive automobile in order for the weight of the motor to increase the traction between the rear wheels and the road surface. If a front-wheel drive automobile were desired then clearly it would be desirable to position the motor at the front of the automobile for the same reason. For reasons of space, the generator is conveniently located at the opposite end of the automobile to the drive motor or motors.

In operation, the automobile is started by battery power which starts the gas turbine 1 and the pump 5 and supplies initial power to the drive motor or motors. The turbine 1 immediately begins to supply power to the generator 11 to charge the battery 16. The voltage regulator 12 senses the amount of charge on the battery and adjusts the fuel flow to the turbine and excitation voltage to the generator field, thus regulating the charge rate on the battery. As explained above, additional power is supplied to the generator 11 by the free-wheeling turbine 7 powered by gas heated by the exhaust of the turbine 1.

The solar panel 17, which is preferably mounted on the roof of the automobile, supplies charge to the battery 16 as long as sunlight is incident thereon. Thus when the automobile is stationary charge is being supplied to the battery by the generator 11 and the solar panel during sunlight hours, whilst when the automobile is stationary charge is supplied by the solar panel during sunlight hours and the auxiliary power source (if connected at A). In this way a constant charge may be maintained at all times to the battery.

Figure 3:
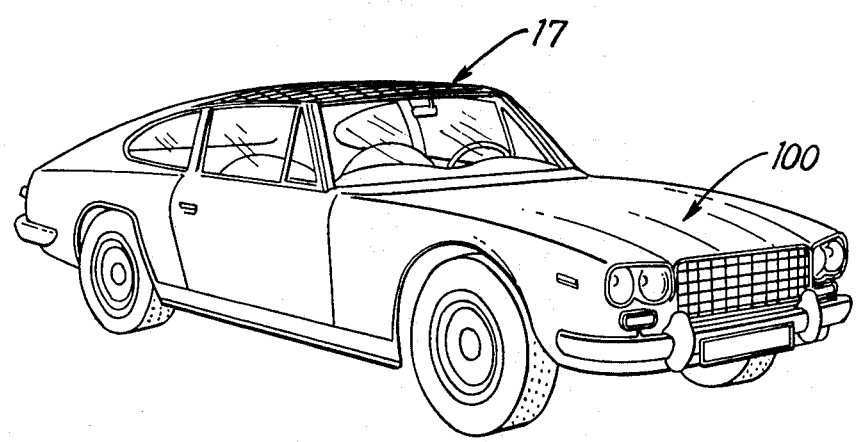
FIG. 3 illustrates a perspective view of an automobile shown in the position of solar cells on the automobile body.

FIG. 3 shows, by way of example a vehicle 100 with the solar panel 17 mounted on the roof thereof.

It is, however, possible to use other power sources to supplement the solar cell and the use of fuel cells is particularly advantageous.

Although the above embodiment has been described with reference to an automobile, it is not limited thereto. For example, the embodiment may advantageously be used to power an air ship. Such an air ship would be provided with solar cells whose orientation may be controlled by a suntracking device. Such vehicles have various advantages over conventional aircraft including the fact that they can sit idly in the air while their batteries are being recharged. Such an air ship, would, of course, have a suitable propulsion means driven by at least one electric drive motor as above.

Figure 4:
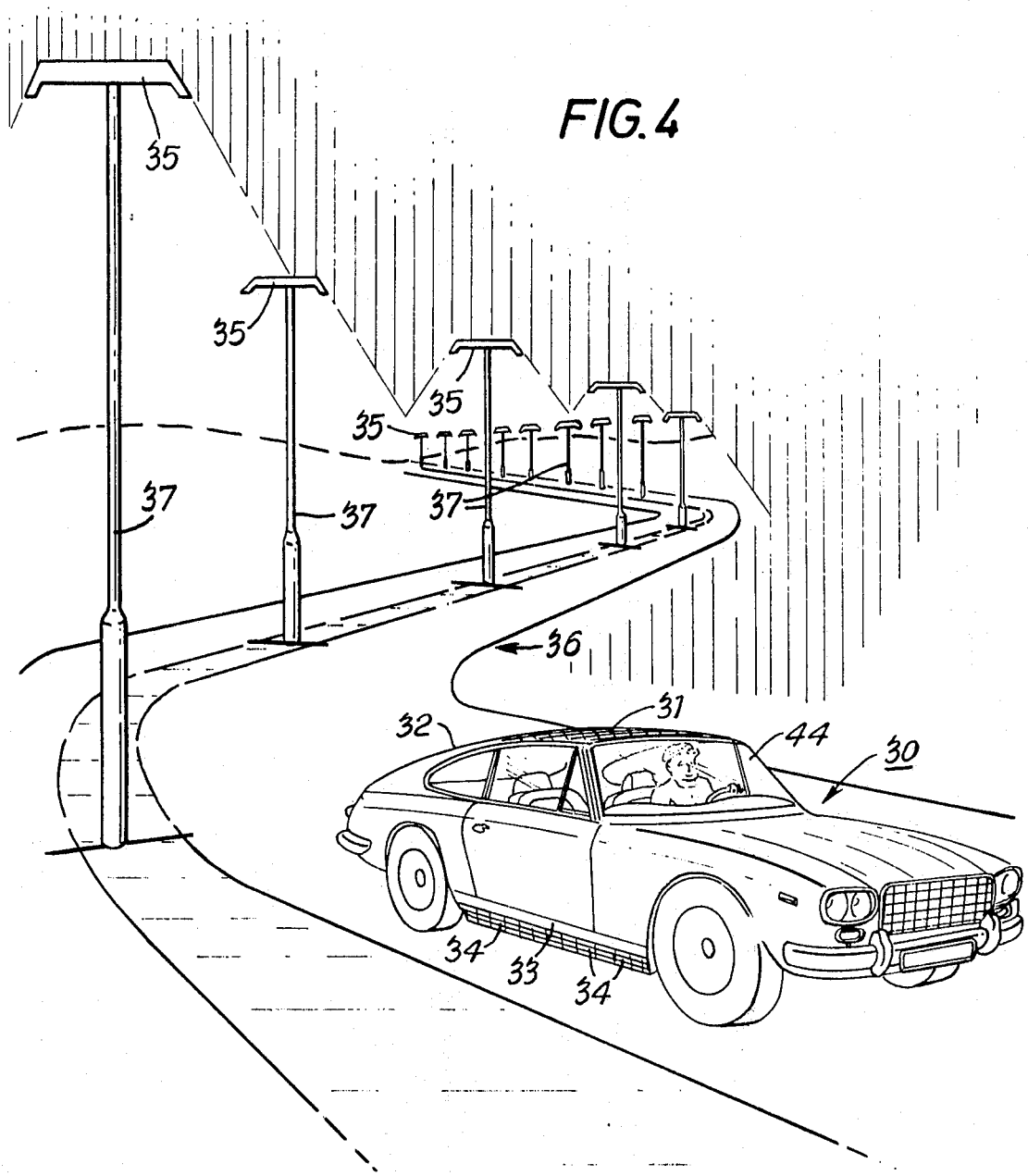
FIG. 4 illustrates a perspective view of a system utilizing high-intensity lights along a roadway and an electrically powered vehicle according to the invention.

Referring to FIG. 4, in another embodiment of the invention, a vehicle 30 such as an automobile is provided not only with solar cells 31 on the roof 31 but also with other energy-conversion cells 33 on the side panels 34. These energy-conversion cells 33 are of a type to convert high-intensity light into electrical energy. Both types of cells 31, 33 are connected to a battery (not shown) of the automobile in a manner as described above.

In order to provide a source of high-intensity light, a network of high-intensity lamps 35 are disposed along the roadway 36 on suitable stanchions 37 to not only illuminate the roadway 36 but also to direct high-intensity light onto the high-intensity light-receiving cells 33 of the vehicle 30 during travel along the roadway 36.

Figure 7:
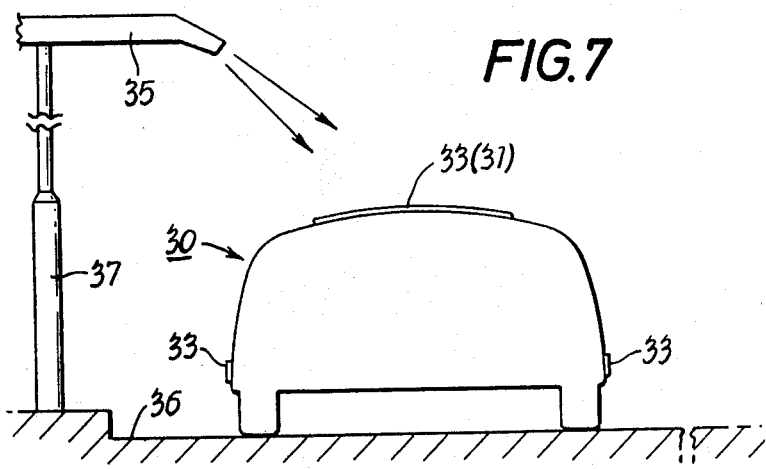
FIG. 7 illustrates a rear view of a vehicle on a roadway as shown in FIG. 4.

Referring to FIGS. 4 and 7, the high-intensity light receiving means 33 can also be mounted on the roof 32 of the vehicle 30 adjacent the solar cells to receive incident light from the lamps 35.

Figure 5:
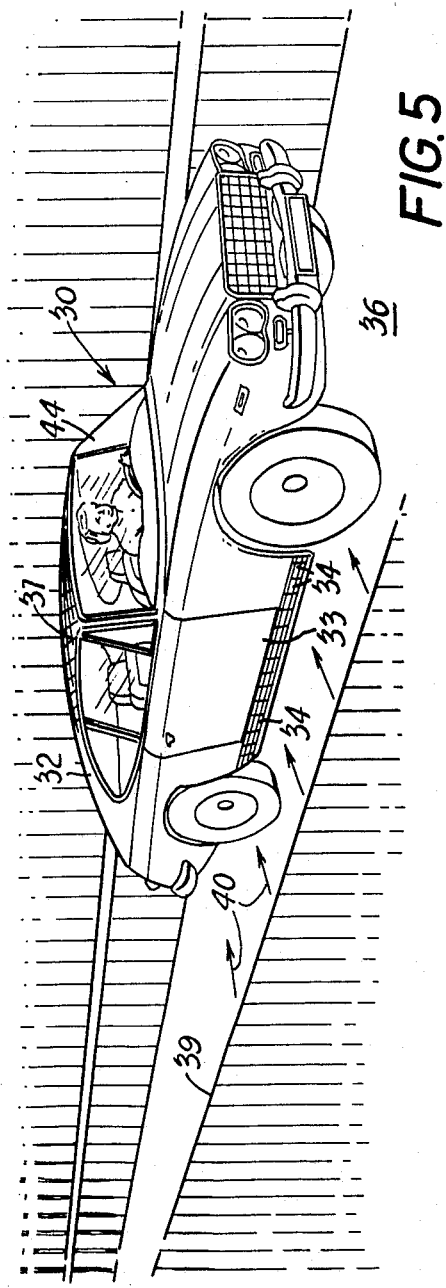
FIG. 5 illustrates a view similar to FIG. 4 with high-intensity lights located alongside the edges of roadway.
Figure 8:
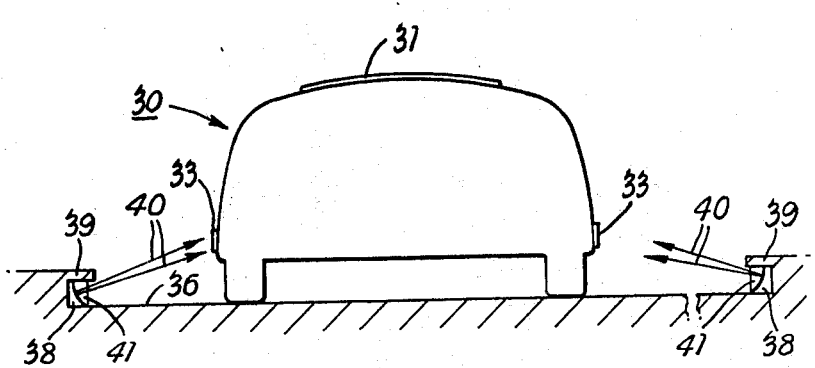
FIG. 8 illustrates a rear view of a vehicle on a roadway as shown in FIG. 5.

Referring to FIGS. 5 and 8, wherein like reference characters indicate like parts as above, a network of high-intensity lamps 38 can alternatively be disposed along one or both edges of the roadway 36 to direct high-intensity light 40 substantially horizontally across the roadway 36 for incidence on suitable light-receiving cells 33 on the lowermost panels 34 of the automobile. These lamps 38 can be disposed within a curb 39 running along the roadway 36 and can be recessed with a suitable angle of lighting to avoid glare. In addition, various types of grills 41 can be disposed along the curb 39 to reduce the glare of the lamps 38.

Figure 6:
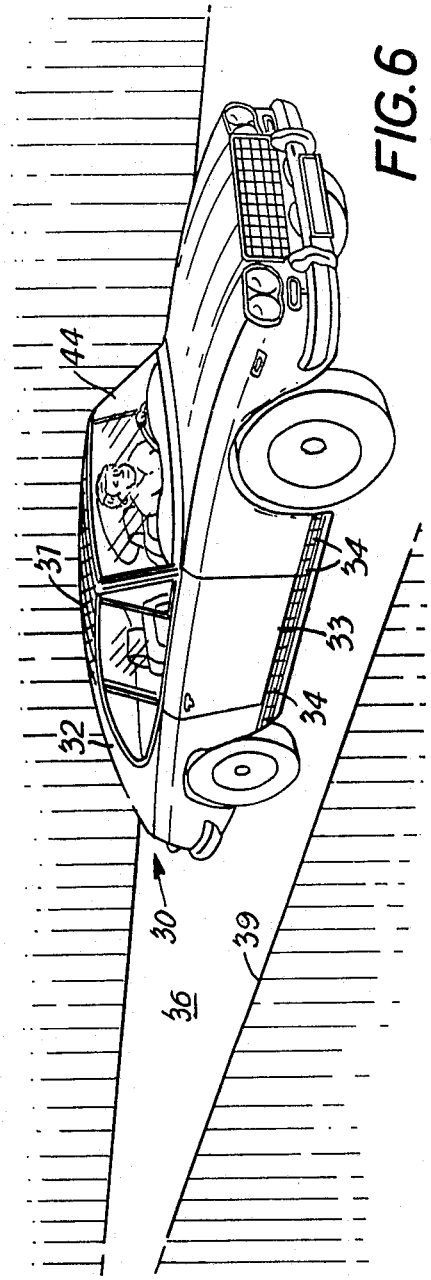
FIG. 6 illustrates a view similar to FIG. 5 having a high-intensity light source in the roadway.
Figure 9:
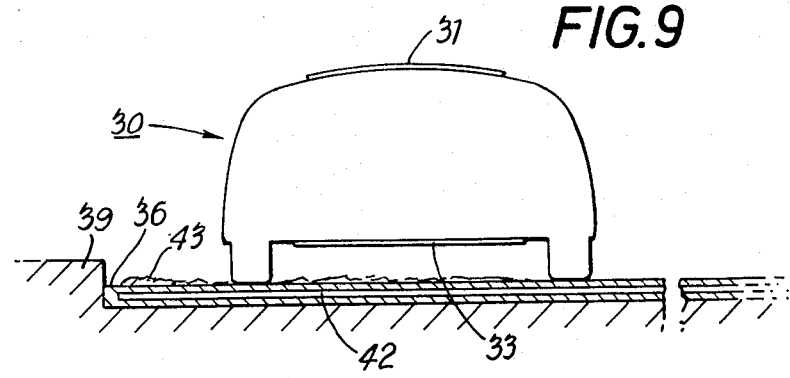
FIG. 9 illustrates a rear view of a vehicle as shown in FIG. 6.

Referring to FIGS. 6 and 9, wherein like reference characters indicate like parts as above, high intensity-light sources or lamps 42 can alternatively be disposed within the roadway 36 not only to supply light for light-receiving cells 33 on the underside of the vehicle 30 but also to act as a means to control the temperature of the roadway surface in order to melt ice and snow 43. In this embodiment, there would be little, if any, glare produced by the light sources 42. Protection, of course, would be provided for the light sources to avoid any damage of an automobile.

Figure 14:
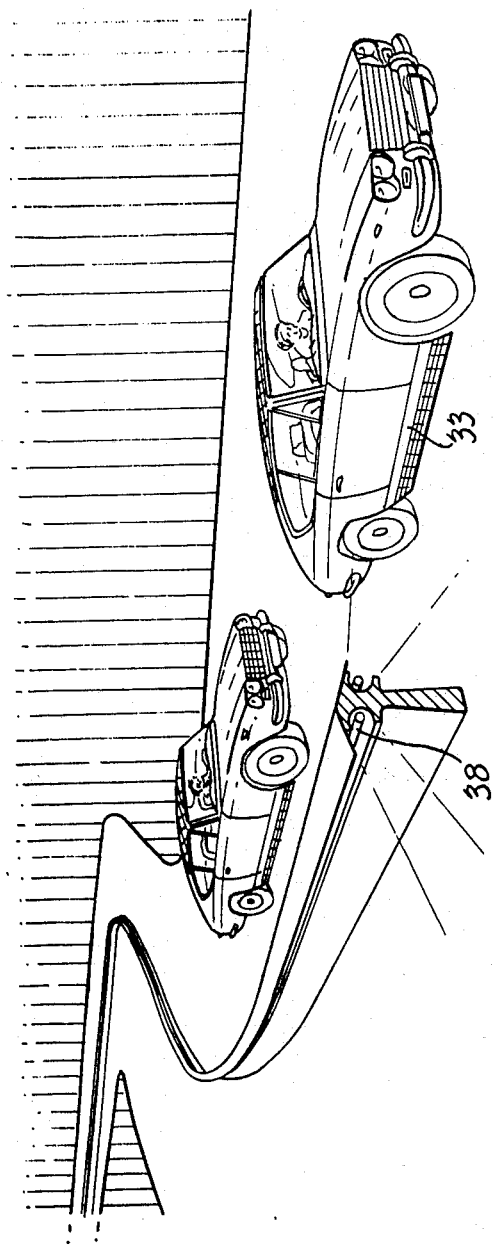
FIG. 14 illustrates another form of lighting system.

Referring to FIG. 14, wherein like reference characters indicate like parts as above, the lamps 35 can be disposed on stanchions 37 of relatively low height to direct high-intensity light towards the sides of passing vehicles 30. In this case, the stanchions 37 and lamps 35 are made in a continuous line, as shown, and are located on both sides of a roadway.

Referring to FIGS. 4, 5 and 6, in order to reduce glare, the vehicle 30 can be provided with a polarized windshield 44 for screening out high-intensity light.

Figure 11:
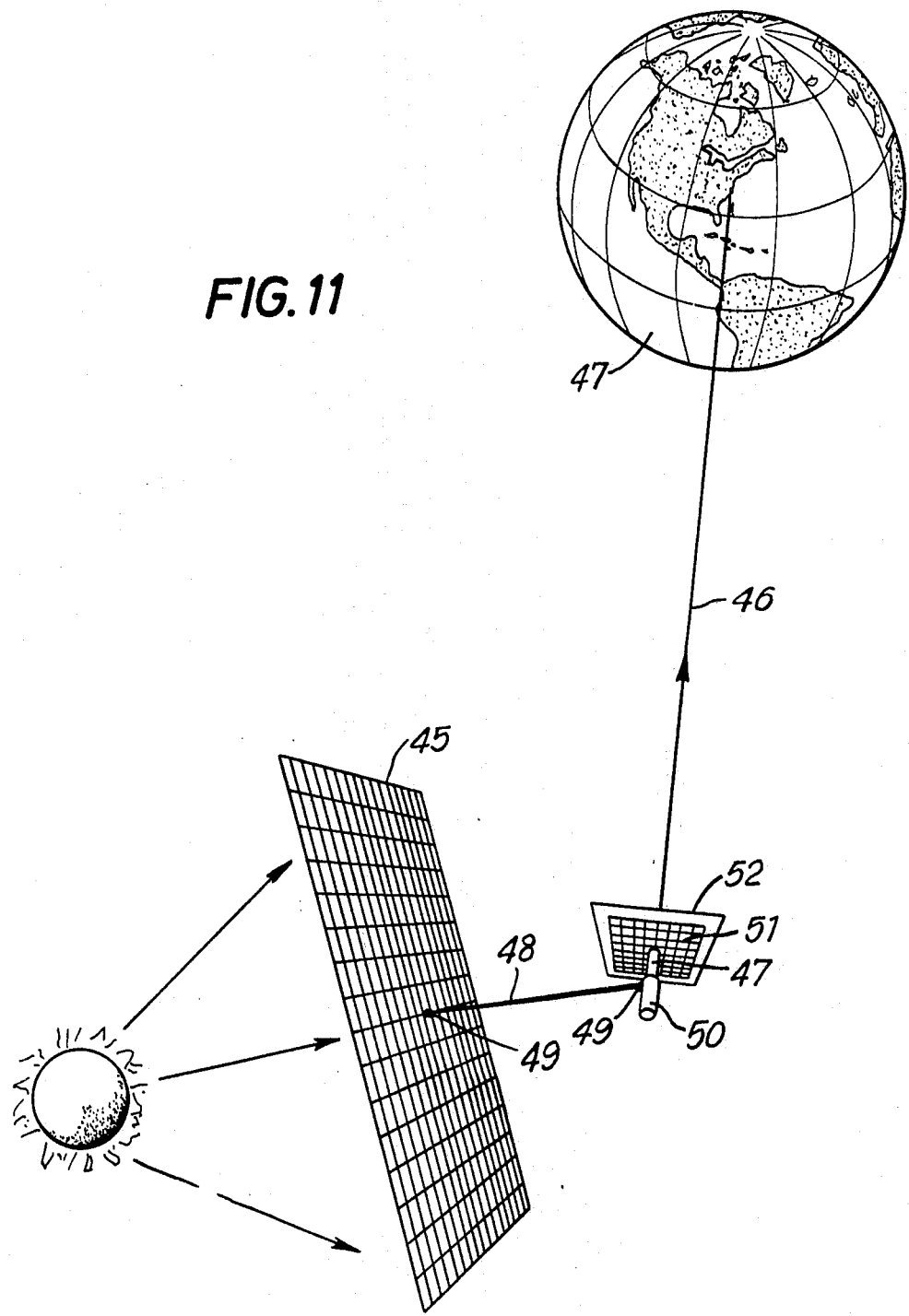
FIG. 11 illustrates a satellite-type of system according to the invention.

Referring to FIG. 11, in order to supply the energy for the high-intensity light sources shown in FIGS. 4, 7 to 9 and 14, use may be made of satellite systems. For example, a satellite-type collector means can be disposed in space for receiving and converting radiant energy from the sun into electrical energy. Such a satellite-type collector means can utilize any suitable type of radiant-energy collecting surfaces for this purpose. For example, the collector may be of the type described in SCIENTIFIC AMERICAN, Vol. 224, No. 3, September 1971, page 159. This publication describes a solar collector stationary orbit having a 5 mile square collecting panel 45 to intercept $8.5 \times 10^7$ kilowatts of radiant solar power with solar cells (not shown) operating at an efficiency of about 18% to convert this to about $1.5 \times 10^7$ kilowatts of electrical power which would be converted into microwaves 46 and beamed to the earth 47 for conversion into $1.5 \times 10^7$ kilowatts of electrical power. The collector would also include a control station 47 which is connected by an electrical transmission line 48 to the solar collector panel 45, articulation being made by rotary joints 49. In addition, cooling equipment 50 would be disposed adjacent the control station 47 and the control station 47 would be provided with a microwave antenna 51 of a one mile square panel having a waste heat radiator 52 at the border.

The collector means may also have a sun-tracking device (not shown) for orienting the collecting surface panel 45 in a predetermined position relative to the sun as well as means for storing the electrical energy.

Figure 12:
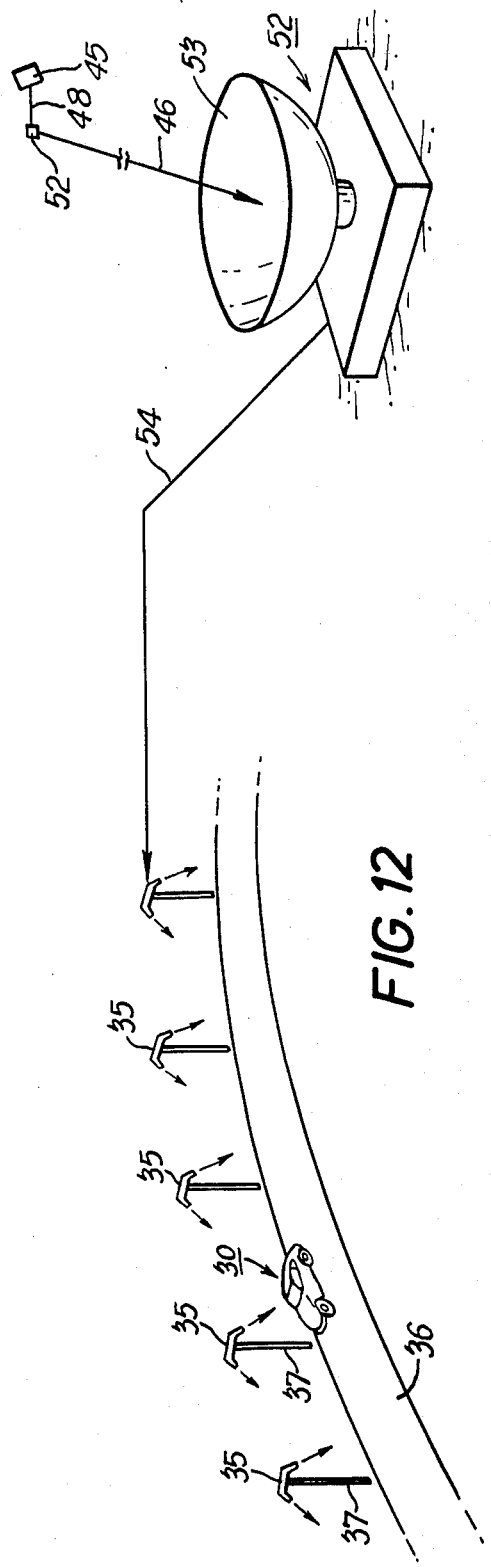
FIG. 12 illustrates a schematic view of one system according to the invention using a land-based receiver means.

Referring to FIG. 12, wherein like reference characters indicate like parts as above, a receiving means 52 for receiving the energy from a satellite-type collector means can be a land based power station. This receiving means 52 includes an antenna 53 for receiving the energy, for example, the microwaves 46, as well as any suitable means, as is known, for converting microwave energy into electrical energy. The receiving means 52 also includes suitable power transmission lines 54 for delivering of electrical energy to the respective lamps 35 of a network of high-intensity lamps 35 along a roadway.

Figure 13:
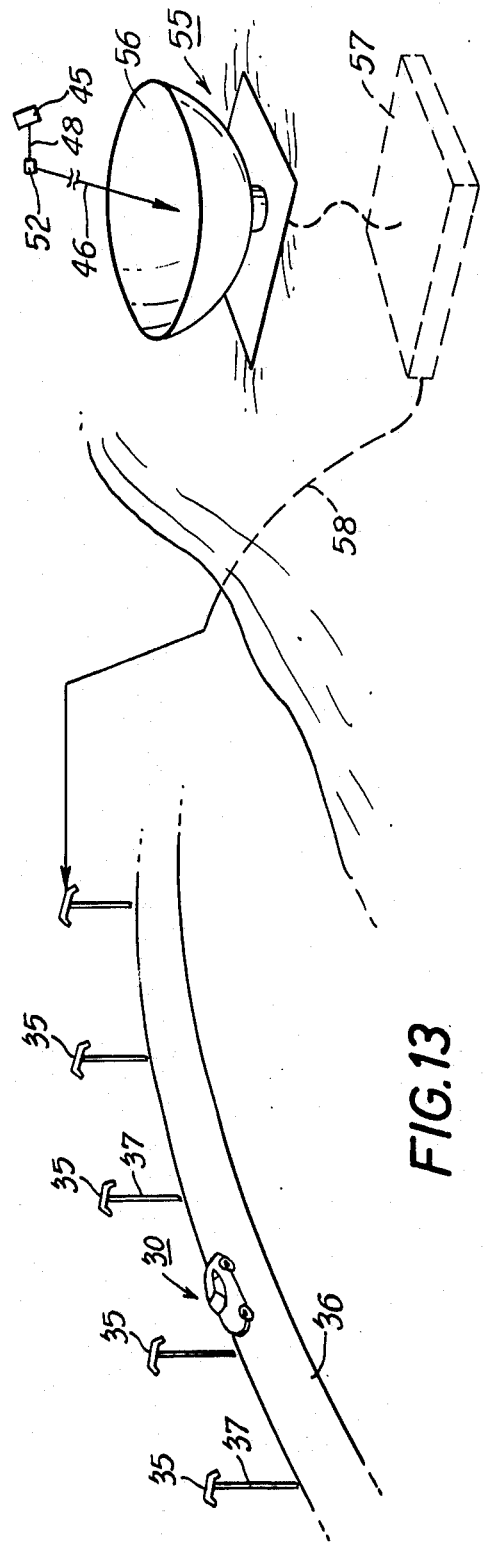
FIG. 13 illustrates a schematic view of a system according to the invention using an offshore receiving means.

Referring to FIG. 13, wherein like reference characters indicate like parts as above, the receiving means 55 can alternatively be disposed in an offshore environment. In such a case, the receiving means 55 can be in the form of a "floating" offshore platform having a floating receiving antenna 56 for receiving a microwave 46 and a power station 57 to convert the received microwave into electrical energy for transmission via a cable 58 into the various networks of high intensity lamps 35.

Figure 10:
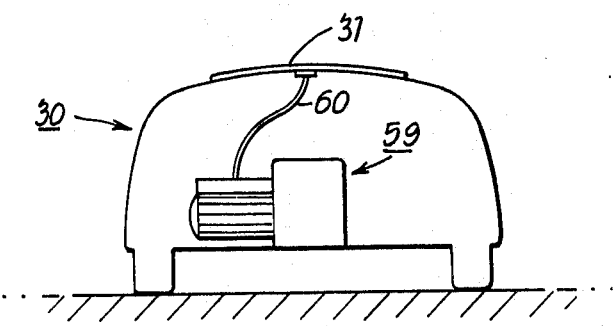
FIG. 10 illustrates a partial rear view of a vehicle utilizing an auxiliary solar steam engine according to the invention.

Referring to FIG. 10, the vehicle 30 can also be provided with an auxiliary means 59 for independently propelling the vehicle 30. For example, the auxiliary means 59 can be in the form of a solar steam engine. In this case, the engine 59 is connected by a suitable means such as an electrical cable 60 to a solar cell panel 31 on the roof of the vehicle to receive electrical energy. This energy would then be used within the engines 59 to heat and convert water to steam. The resultant steam can then be used to drive a turbine or other suitable mechanism (not shown) for powering the vehicle.

The invention thus provides a system whereby solar energy may be beamed from outer space by means of satellites for conversion and redistribution to a network of high intensity lamps to provide a source of power for electrically-driven vehicles having cell means for receiving and converting the light into electrical energy. The vehicles can be constructed to operate either directly under the influence of the received electrical energy or indirectly by having the energy stored in batteries contained in the vehicle.

The energy to provide the high-intensity light along a roadway can be distributed from a distant point using any or all means currently known to produce electricity. For example, the power stations may rely on solar energy (current and stored), tides, geothermal heat, fission fuels and fusion fuels, nuclear power, air currents, all of which may operate from land, sea or air either individually or in combination with one another, to beam electrical power. Any other source of energy can also be used, e.g. natural means such as the sun, stars or moon or a man-made source to produce and transfer electric current that may be converted into high intensity light for transmission to solar cells to operate vehicles on land, sea, air, outerspace or underground.

The solar cells are of the type to produce, at sea level, 0.3 watts (electrical D.C.) per square centimeter. As one example of a solar cell which can be utilized, reference is made to a solar cell produced by IBM which has a measured conversion efficiency of sunlight to electrically of 18% compared to about 14% in previously reported silicon cells and 13% in existing gallium arsenide cells. These IBM solar cells are made by growing a layer of $Ga_1 - X A 1_x A_s$, heavily doped with zinc (about $10^{19}$ to about $10^{20}$ atoms per cubic centimeter) on top of a crystal of n-type CaAs; growth being by liquid-phase epitaxy.

Instead of using high intensity light, high frequency lights can be used to provide the light source from which the cell means on a vehicle can produce electrical power.

By providing a system which relies on only pure light with no pollution from gasoline, diesel fuel, and the like, higways, towns and other populated areas can be made free of any poisonous, dangerous fumes.

In the case of the light source which is beamed from one or both sides of a roadway, either directly or reflected, the source is a little higher than the average curb level, for example, it may be about 8 inches above the roadway surface. The lamps can be sealed in plastic or glass or any other suitable material. Further, the intensity of the high intensity light sources can be increased during inclement weather to melt ice and snow from the road surfaces as well as to aid in the dispersing of fog along the roadway, and maintain a lighted roadway to ensure better vision for driver and passengers.

The cells which operate in response to artificial light can also work in combination with the solar cells during daylight hours.

What is claimed is:

1. An electric-powered vehicle having wheels driven by at least one electric drive motor; a battery consisting of a multiplicity of cells electrically connected to the or each motor for supplying power thereto; control means for regulating the supply of power from the battery to the or each drive motor; at least one bank of solar cells mounted on the vehicle in such a position as to be exposed to solar radiation during sunlight hours; means electrically connecting the or each bank of solar cells to the battery, said means including isolating means for protecting the solar cells against reverse current from the battery; an electrical generator adapted to supply charge to the battery; an intermittently operating gas turbine drivingly connected to the generator for operating the same; a heat exchanger adapted to receive hot waste gases from said turbine and transfer heat to a heat exchange medium circulating therein; a free-wheeling turbine drivingly connected to the generator; conduit means for supplying heated heat exchange medium in gaseous form to the free-wheeling turbine and for returning heat exchange medium therefrom to the heat exchanger; and a voltage regulator interpositioned between the generator and the battery for controlling the flow of charge to the battery, said voltage regulator having freedback means for controlling the operation of the first-mentioned turbine and of the generator in accordance with the charge existing on the battery.

2. An electric-powered vehicle according to claim 1 wherein said isolating means comprises a diode.

3. An electric-powered vehicle according to claim 1 wherein the first-mentioned turbine is powered by the combustion of butane gas.

4. An electric-powered vehicle according to claim 1 wherein the heat exchange medium is a non-flammable fluorinated hydrocarbon.

5. An electric-powered vehicle according to claim 3 wherein the heat exchange medium is a non-flammable fluorinated hydrocarbon.

6. An electric-powered vehicle according to claim 1 comprising auxiliary charging means for the battery adapted to be connected to a mains voltage supply.

7. An electric-powered vehicle according to claim 1 wherein said drive motor is an alternating current induction motor, and said control means comprises logic circuit elements responsive to driver operable controls and a speed signal supplied by the drive motor, means under the control of the logic circuit elements for producing a succession of pulses of a frequency and width corresponding to the torque demanded by the condition of the driver operable controls.

8. An electric-powered vehicle according to claim 7 wherein the vehicle is provided with heaters which are supplied with heat by a portion of the heated heat-exchange medium from said heat exchanger, and a radiator is connected to receive a portion of the heat exchange medium whereby the radiator acts as a heat dump for excess heat produced by the first-mentioned turbine.

9. An electric-powered vehicle according to claim 1 wherein said battery consists of a multiplicity of nickel-silver cells.

10. An electric-powered vehicle according to claim 1 wherein said battery consists of a multiplicity of zinc-air cells.

11. An electric-powered vehicle according to claim 1 wherein said battery consists of a multiplicity of alkali metal/sulfur cells.

12. An electric-powered vehicle according to claim 1 comprising fuel cells as an additional source of electrical power.

* * * * *